United States Patent
Sada

(10) Patent No.: US 11,363,817 B1
(45) Date of Patent: *Jun. 21, 2022

(54) METHOD OF PROTECTING DETERMINATE SOYBEAN FROM DAMAGE BY A PLANT PATHOGEN

(71) Applicant: SUMITOMO CHEMICAL COMPANY, LIMITED, Tokyo (JP)

(72) Inventor: Yoshinao Sada, Kasai (JP)

(73) Assignee: SUMITOMO CHEMICAL COMPANY, LIMITED, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/690,878

(22) Filed: Mar. 9, 2022

Related U.S. Application Data

(63) Continuation of application No. 16/396,343, filed on Apr. 26, 2019, now Pat. No. 11,304,417.

(30) Foreign Application Priority Data

Apr. 9, 2019 (JP) .............................. JP2019-073972

(51) Int. Cl.
*A01N 43/653* (2006.01)
*A01N 25/02* (2006.01)
*A01P 3/00* (2006.01)
*A01N 25/00* (2006.01)

(52) U.S. Cl.
CPC ............ *A01N 43/653* (2013.01); *A01N 25/00* (2013.01); *A01N 25/02* (2013.01); *A01P 3/00* (2021.08)

(58) Field of Classification Search
CPC ...... A01N 43/653; A01N 25/00; A01N 25/02; A01P 3/00
See application file for complete search history.

(56) References Cited

U.S. PATENT DOCUMENTS

2014/0155262 A1    6/2014    Dietz et al.

FOREIGN PATENT DOCUMENTS

| WO | WO 2013/007767 A1 | 1/2013 |
| WO | WO 2014/095994 A1 | 6/2014 |
| WO | WO 2017/157916 A1 | 9/2017 |
| WO | WO 2018/177880 A1 | 10/2018 |

OTHER PUBLICATIONS

Bernard, R. L., "Two Genes Affecting Stem Termination in Soybeans", Crop Science, vol. 12, Mar. 1972, pp. 235-239.
Illinois Soybean Production Guide, Systemic Strategies to Increasing Yields, 2012, Department of Agriculture Illinois State University, pp. 1-44.
International Search Report for International Application No. PCT/JP2020/015502, dated Jun. 30, 2020.
Written Opinion of the International Searching Authority for International Application No. PCT/JP2020/015502, dated Jun. 30, 2020.

*Primary Examiner* — Erin E Hirt
*Assistant Examiner* — Andriae M Holt
(74) *Attorney, Agent, or Firm* — Birch, Stewart, Kolasch & Birch, LLP

(57) ABSTRACT

The present invention can provide a method having superior safety for protecting determinate soybean from damage by a plant pathogen. The method includes a step of applying mefentrifluconazole to foliage of determinate soybean, seeds of determinate soybean or a soil of the cultivation area of determinate soybean, wherein the application rate of mefentrifluconazole is 20 to 500 g per hectare of cultivation area.

2 Claims, No Drawings

METHOD OF PROTECTING DETERMINATE SOYBEAN FROM DAMAGE BY A PLANT PATHOGEN

CROSS-REFERENCE TO RELATED APPLICATION

This application is a Continuation of application Ser. No. 16/396,343, filed Apr. 26, 2019, which claims priority under 35 U.S.C. § 119(b) to Japanese Application No. 2019-073972, filed Apr. 9, 2019, the disclosure of which is incorporated herein by reference in its entirety.

TECHNICAL FIELD

The present invention relates to a method of protecting determinate soybean from damage by a plant pathogen.

BACKGROUND ART

Hitherto, a method of applying mefentrifluconazole has been known, as a method for controlling a plant pathogen on soybean (see Patent Document 1). Also, several types of soybean such as determinate soybean, indeterminate soybean and semi-determinate soybean are known (see Non-Patent Document 1). However, it is not known that determinate soybean, especially, can be safely protected from damage by a plant pathogen by applying mefentrifluconazole at certain application rate.

CITATION LIST

Patent Document

Patent Document 1: WO2013/007767

Non-Patent Document

Non-Patent Document 1: Crop Science 12 (1972), 235-239.

SUMMARY OF THE INVENTION

Problems to be Solved by the Invention

An object of the present invention is to provide a method having superior safety for protecting determinate soybean from damage by a plant pathogen.

Means for Solving the Problems

The present inventor has found out that determinate soybean can be safely protected from damage by a plant pathogen by applying mefentrifluconazole at certain application rates to foliage of determinate soybean, seeds of determinate soybean, or a soil of cultivation area of determinate soybean.

The present invention includes the following aspects [1] and [2].

[1] A method of protecting determinate soybean from damage by a plant pathogen in a cultivation area of determinate soybean, the method including a step of applying mefentrifluconazole to foliage of determinate soybean, seeds of determinate soybean or a soil of the cultivation area of determinate soybean, wherein the application rate of mefentrifluconazole is 20 to 500 g per hectare of the cultivation area.

[2] The method according to [1], wherein mefentrifluconazole is applied to foliage of determinate soybean.

Effect of the Invention

Determinate soybean can be safely protected from damage by a plant pathogen according to the present invention.

MODE FOR CARRYING OUT THE INVENTION

The method of protecting determinate soybean from damage by a plant pathogen of the present invention (hereinafter, sometimes referred to as "present method") includes a step of applying mefentrifluconazole to foliage of determinate soybean, seeds of determinate soybean or a soil of cultivation area of determinate soybean.

Mefentrifluconazole is a triazole-type sterol biosynthesis inhibitor, and can be manufactured by a known method.

Soybean in the present invention is a plant species generally described as *Glycine max* in scientific name, but it also includes 'biologically identical species having the homogeneous genome to *Glycine max*' such as wild soybean (*Glycine soja*, also known as *Glycine max* subsp. *soja*). Determinate soybean in the present method is a variety group among the aforementioned soybean showing a genotype dt1/dt1 at the locus (Dt1) relating to the growth habit. Varieties showing Dt1/dt1 or Dt1/Dt1 on the locus become indeterminate soybean or semi-determinate soybean depending on the condition on another locus (Dt2) relating to the growth habit.

In the present method, variations within determinate soybean are not particularly limited as long as the determinate soybean is a variety which is usually cultivated. For example, determinate soybean belonging to diverse maturity groups from early-maturing to late-maturing can be used. Also, the varieties are not limited by diverse intended usages of the harvest of determinate soybean. For example, determinate soybean for any of the intended usages such as seed production, ornamentals, green manures, silage, grains, and the like can be used. For grains, determinate soybean for any of the intended usages such as food, oil extraction, feed, flour milling, and the like can be used.

Examples of determinate soybean varieties include Toyomusume, Sachiyutaka, Fukunari, Tambaguro, Enrei, Hobbit87, Asgrow AG53X6, Credenz CZ5225LL and the like. Examples of soybean which does not belong to determinate soybean include Williams 82, Harosoy, Kurosengoku, Tsurusengoku, wild soybean, Asgrow AG4934, Credenz CZ4590RY and the like. Although the weight of seeds of determinate soybean which can be used in the present method is not particularly limited, a seed weight of determinate soybean is usually within a range of 20 to 600 mg/seed, more preferably 250 to 500 mg/seed.

The determinate soybean may be the one producible by natural crossing, plants producible by a mutation, F1 hybrid plants, or transgenic plants (also called genetically modified plants). These plants generally have characteristics such as tolerance to herbicides, accumulation of substances harmful to insect pests, reduction in sensitivity to diseases, increase in yield potential, improvement in resistance to biotic or abiotic stress factors, accumulation of substances, and improvement in preservability and processability.

The F1 hybrid plants are those which are each a first filial hybrid obtained by crossing two different varieties with each other and usually have characteristics of heterosis, which is a nature of having more excellent trait than both of the parents. The transgenic plants are those which are obtained by introducing an exogeneous gene from other organisms such as microorganisms and have characteristics like those that cannot be easily obtained by crossbreeding, mutation induction, or natural recombination in natural environments.

Examples of the technologies used to create the above plants include conventional type variety improvement technologies; genetic recombination technologies; genome breeding technologies; new breeding technologies; and genome editing technologies. The conventional type variety improvement technologies are specifically technologies for obtaining plants having desired properties by a mutation and crossing. The genetic recombination technologies are technologies in which a target gene (DNA) is extracted from a certain organism (for example, microorganism) to introduce it into a genome of a different target organism, thereby imparting new properties to the organism, and antisense technologies or RNA interference technologies for imparting new or improved characteristics by silencing a certain genes existing in plants. The genome breeding technologies are those improving breeding efficiency by using genome information and include DNA marker (also called genome markers or genetical markers) breeding technologies and genomic selection. For example, the DNA marker breeding is a method in which a progeny having a target gene with a useful trait is selected from a lot of cross progenies by using a DNA marker which is a DNA sequence and is a marker of the presence position of a gene with a specific useful trait on a genome. This method has the characteristics that the time required for breeding can be efficiently reduced by analyzing the cross progeny using a DNA marker when the progeny is a juvenile plant.

Also, the genomic selection is a technique in which a prediction formula is created from a phenotype obtained in advance and genome information to predict the characteristics from the prediction formula and the genome information without any evaluation of the phenotype and is technologies contributing to improvement in efficient breeding. The new breeding techniques are a generic term of variety-improvement (=breeding) techniques that are combinations of molecular biological techniques. Examples of the new breeding techniques include cisgenesis/intragenesis, introduction of an oligonucleotide-directed mutation, RNA-dependent DNA methylation, grafting onto a GM rootstock or scion, reverse breeding, agroinfiltration, and seed production technology (SPT). The genome editing technologies are those in which genetic information is transformed in a sequence-specific manner which enables, for example, deletion of a base sequence, substitution of an amino acid sequence, and introduction of an exogenous gene. Examples of tools for these techniques include sequence-specific genome modification techniques such as zinc-finger nuclease (ZFN), TALEN, CRISPR/Cas9, CRISPER/Cpf1, and Meganuclease which each enable sequence-specific DNA scission and CAS9 Nickase and Target-AID which are each created by modifying the aforementioned tools.

Examples of the plants mentioned above include plants listed in GM APPROVAL DATABASE of genetically modified crops in the electronic information site (http://www.isaaa.org/) of INTERNATIONAL SERVICE for the ACQUISITION of AGRI-BIOTECH APPLICATIONS (ISAAA). More specifically, these examples include herbicide tolerant plants, insect pest resistant plants, disease resistant plants, and quality modified (for example, increase or decrease in content of a certain component or change in composition) plants of products (for example, starch, amino acid, and fatty acid), fertile trait modified plants, abiotic stress tolerant plants, or plants modified in traits relating to growth and yield.

Examples of plants to which tolerance to herbicides is imparted are given as follows.

The tolerance to herbicides is obtained, for example, by reducing the compatibility of a chemical with its target, by rapid metabolism (for example, breakdown or modification) resulting from the expression of a chemical deactivation enzyme, or by inhibiting the incorporation of a chemical into a plant body or the transfer of the chemical in the plant body.

The plants to which herbicide tolerance is imparted by genetic recombination technologies include plants to which tolerances to the following inhibitors are imparted by genetic recombination technologies: 4-hydroxyphenyl pyruvate dioxygenase (hereinafter abbreviated as HPPD) inhibitors such as isoxaflutole and mesotrione, acetolactate synthetase (hereinafter abbreviated as ALS) inhibitors such as imidazolinone type herbicides including imazethapyr and sulfonylurea type herbicides including thifensulfuron-methyl, 5-enolpyruvylshikimate-3-phosphate synthase (hereinafter abbreviated as EPSP) inhibitors such as glyphosate, glutamine synthetase inhibitors such as glufosinate, auxin type herbicides such as 2,4-D and dicamba, oxynil type herbicides including bromoxynil, and protoporphyrinogen oxidase (herein after abbreviated as PPO) such as flumioxazin.

In the present method, mefentrifluconazole is usually used after making formulation by mixing with a carrier such as a solid or liquid carrier, and adding auxiliary agents for formulation such as a surfactant as necessary. In the case of making formulation, preferable formulation type is a soluble liquid, soluble granule, an aqueous suspension concentrate, oil-based liquid suspension, wettable powder, water dispersible granule, granule, aqueous emulsion, oil-based emulsion, and emulsifiable concentrate. More preferable formulation type is aqueous suspension concentrate. Moreover, a formulation containing mefentrifluconazole singly as an active ingredient may be independently used or may be tank-mixed with a formulation containing other fungicides as active ingredients. Also, a formulation containing mefentrifluconazole and other fungicide may be used. Also, a formulation containing mefentrifluconazole and other fungicide as active ingredients may be tank-mixed with a formulation containing, as active ingredients, fungicide different from the above fungicides. The content of the active ingredients (mefentrifluconazole or a total of mefentrifluconazole and other fungicides) in the formulation is usually within a range of 0.01 to 90% by weight, preferably 1 to 80% by weight.

In the present method, "applying mefentrifluconazole to foliage of determinate soybean" means to apply mefentrifluconazole to foliage of determinate soybean planted in the cultivation area.

In the present method, when applying mefentrifluconazole to foliage of determinate soybean or a soil of the cultivation area of determinate soybean, the application is usually conducted using a spray dilution prepared by mixing a formulation containing mefentrifluconazole with water. These applications may be conducted uniformly on the cultivation area, or may be conducted locally as a spot treatment onto foliage of determinate soybean or the soil around the determinate soybean. The amount of the dilution to be sprayed is usually 10 to 1000 L, preferably 100 to 500 L, and more preferably 140 to 300 L per hectare of cultivation area of determinate soybean though no particular limitation is imposed on it.

In the present method, when applying mefentrifluconazole to seeds of determinate soybean, the treatment is usually conducted by coating or spraying seeds with a dilution prepared by mixing a formulation containing mefentrifluconazole with water.

In the present method, the application rate of mefentrifluconazole is usually within a range of 20 to 500 g, preferably 40 to 200 g, more preferably 60 to 150 g per hectare of cultivation area of determinate soybean. Examples of the specific application rates of mefentrifluconazole include 30 g, 50 g, 70 g, 80 g, 100 g, 120 g, 250 g, 300 g, and 400 g per hectare of cultivation area of determinate soybean. These application rates can be described with "approximately." "Approximately" means plus/minus 10%, so, for example, "approximately 100 g per hectare" means "90 to 110 g per hectare."

In the present method, when applying mefentrifluconazole locally as a spot treatment onto foliage of determinate soybean or the soil around the determinate soybean, usually 0.001 to 2 mg of mefentrifluconazole is applied per determinate soybean plant. Preferably, 0.01 to 1 mg of mefentrifluconazole is applied per determinate soybean plant. For example when 0.5 mg of mefentrifluconazole is applied locally per plant as a spot treatment and 400,000 plants are grown per hectare of cultivation area, the application rate of mefentrifluconazole is 200 g per hectare of cultivation area of determinate soybean.

In the present method, when applying mefentrifluconazole to seeds of determinate soybean, 0.001 to 1 mg of mefentrifluconazole is usually applied per seed of determinate soybean. Preferably 0.01 to 0.2 mg of mefentrifluconazole is applied per seed of determinate soybean. Seeds treated with mefentrifluconazole are usually sown uniformly to cultivation area so that the application rates of mefentrifluconazole per hectare of cultivation area may be a desired range. For example, when 0.1 mg of mefentrifluconazole is applied per seed, and 1,000,000 seeds are sown per hectare of cultivation area, the application rate of mefentrifluconazole is 100 g per hectare of cultivation area.

Although a period of time for conducting the present method is not particularly limited, the period of time is usually within a range from 5 a.m. to 9 p.m., and the photon flux density at land surface of the place where the present method is conducted is usually 10 to 2500 μmol/m²/s.

The spray pressure when conducting the present method is usually 30 to 120 PSI and preferably 40 to 80 PSI though no particular limitation is imposed on it. Here, the spray pressure is a set value just before the dilution is introduced into the nozzle.

The nozzle used in the present method may be flat-fan nozzles or drift-reducing nozzles. Examples of flat-fan nozzles include Teejet110 series and XR Teejet110 series manufactured by Teejet Company. When using these nozzles, the spray pressure is generally 30 to 120 PSI and the volume median diameter of liquid droplets discharged from the nozzle is usually less than 430 micro meter. The drift-reducing nozzle is a nozzle which leads to less drift compared with a flat-fan nozzle and which is called an air induction nozzle or pre-orifice nozzle. The volume median diameter of a liquid droplet discharged from the drift-reducing nozzle is usually 430 micro meter or more.

In the present method, when applying mefentrifluconazole to seeds of determinate soybean, the application is usually conducted before sowing the seeds. In the present method, when applying mefentrifluconazole to foliage of determinate soybean, the application is conducted usually between just after emergence of determinate soybean and its harvesting stage, more preferably between 1 leaf stage of determinate soybean and its grain filling stage, further preferably between 2 leaf stage of determinate soybean and its flowering stage.

In the present method, seeds of determinate soybean may be treated with one or more compounds selected from the group consisting of insecticidal compounds, nematicidal compounds, fungicidal compounds except mefentrifluconazole, and plant growth regulators. Examples of compounds to be used for the seed treatment include neonicotinoid compounds, diamide compounds, carbamate compounds, organophosphorous compounds, biological nematicidal compounds, other insecticidal compounds and nematicidal compounds, strobilurin compounds, metalaxyl compounds, SDHI compounds, other fungicidal compounds except mefentrifluconazole, and plant growth regulators.

Plant pathogens in the present method are usually fungi. Examples of Fungi include Ascomycota, Basidiomycota, Blasocladiomycota, Chytridiomycota, Mucoromycota and Olpidiomycota. Examples of specific plant pathogens include the following. The words in parentheses is damage caused by the plant pathogen (plant disease).

*Cercospora kikuchii* (soybean *Cercospora* blight), *Elsinoe glycines* (soybean scab), *Diaporthe phaseolorum* var. *sojae* (soybean pod and stem blight), *Phakopsora pachyrhizi* (Asian soybean rust), *Corynespora cassiicola* (soybean target spot), *Colletotrichum glycines+Colletotrichum truncatum* (soybean anthracnose), *Rhizoctonia solani* (soybean root rot), *Septoria glycines* (soybean brown spot), *Cercospora sojina* (frogeye leaf spot), *Sclerotinia sclerotiorum* (soybean white mold), *Microsphaera diffusa* (soybean powdery mildew), *Phytophthora sojae* (soybean stem and root rot), *Peronospora manshurica* (soybean downy mildew), *Fusarium virguliforme* (soybean sudden death syndrome), *Calonectria ilicicola* (soybean root necrosis), *Diaporthe longicolla* (soybean *Diaporthe/Phomopsis* complex).

In the above plant pathogens, variations within the species are not particularly limited. Namely, the pathogens also include any plant pathogens having reduced sensitivity (or resistance) to specific fungicides. The reduced sensitivity may be attributed to a mutation at a target site (target site mutations), or may be attributed to a factor other than target site mutation (non-target site mutations). Target site mutations include amino acid substitutions in target proteins caused by a mutation in the corresponding open reading frame, and over expression of the target proteins caused by deletion of a suppressor sequence or an increase of an enhancer sequence at the promotor region, or amplification of gene copy number. The factors of resistance by non-target site mutations include acceleration of efflux of fungicides coming into cells out of the cells by ABC transporter and MDS transporter and the like. It also includes detoxification of fungicides by metabolism.

Examples of aforementioned specific fungicides include nucleic acid synthesis inhibitors (such as phenylamide fungicides, acylamino acid fungicides, DNA topoisomerase type II fungicides), mitosis and cell division inhibitors (such as MBC fungicides, N-phenylcarbamate fungicides), respiration inhibitors (such as QoI fungicides, QiI fungicides, and SDHI fungicides), amino acid synthesis and protein synthesis inhibitors such as (anilinopyrimidine fungicides), signal transduction inhibitors (such as phenylprole fungicides, dicarboximide fungicides), lipid synthesis and cell membrane synthesis inhibitors (such as phosphorothiorate fungicides, dithiorane fungicides, aromatic hydrocarbyl fungicides, heteroaromatic fungicides, carmabate fungicides), sterol biosynthesis inhibitors (for example, DMI fungicides such as triazoles, hyroxyanlide fungicides, aminopyrazolinone fungicides), cell wall synthesis inhibitors (such as polyoxin fungicides, Carboxylic acid amide fungicides), melanin synthesis inhibitors (such as MBI-R fungicides, MBI-D fungicides, MBI-P fungicides), and other fungicides (such as cyanoacetamidoxim fungicides, phenylacetamide fungicides).

In the present method, mefentrifluconazole may be used in combination with one or more other fungicides. For here, using in combination includes tank-mix, pre-mix, and sequential treatment. In the case of sequential treatment, the order of the treatment is not particularly limited.

In the present method, fungicide used in combination with mefentrifluconazole is preferably pyraclostrobin, fluoyram or fluxapyroxad.

When aforementioned fungicide is used in combination with mefentrifluconazole, the weight ratio of mefentrifluconazole to other fungicide is usually within a range of 1:0.001 to 1:100, preferably 1:0.01 to 1:10, more preferably 1:0.1 to 1:5. Examples of the specific weight ratios include 1:0.02, 1:0.04, 1:0.06, 1:0.08, 1:0.2, 1:0.4, 1:0.6, 1:0.8, 1:1, 1:1.5, 1:2, 1:2.5, 1:3, and 1:4. These weight ratios may be described with approximately. Approximately means plus/minus 10%, so, for example "approximately 1:2" means 1:1.8 to 1:2.2.

The cultivation of determinate soybean in the present invention can be managed according to the plant-nutrition in the common crop cultivation. The fertilization system may be based on Precision Agriculture adopting variable rate application or may be conventionally uniform one. In addition, nitrogen fixation bacteria and mycorrhizal fungi may be inoculated by seed treatment.

EXAMPLES

The present invention will be explained by way of examples, but the present invention should not be limited thereto.

Example 1

Determinate soybean is sown to a pot filled with a soil. It is incubated for 7 days in a greenhouse. Mefentrifluconazole spray liquid (prepared by diluting an aqueous suspension concentrate of mefentrifluconazole with water) is uniformly sprayed onto the foliage of determinate soybean at the amount of 200 L per hectare so that the application rate of mefentrifluconazole may be 500 g per hectare. On the next day of the spraying, a pathogen of Asian soybean rust (*Phakopsora pachyrhizi*) is inoculated to the foliage of determinate soybean. The determinate soybean is incubated in a greenhouse for 14 days from the inoculation, and then fresh weight of the aerial part of the determinate soybean is measured. It is confirmed that the fresh weight is equivalent to that of the control where determinate soybean is not treated with mefentrifluconazole and the pathogen is not inoculated (no-treatment-no-inoculation control) and is bigger than that of the control where determinate soybean is not treated with mefentrifluconazole and the pathogen is inoculated (no-treatment-inoculation control).

Comparative Example 1

The same procedure of the example 1 is repeated except for replacing determinate soybean with indeterminate soybean or semi-determinate soybean. It is confirmed that the fresh weight of indeterminate soybean or semi-determinate soybean is smaller than that of the corresponding no-treatment-no-inoculation control and is equivalent to that of the corresponding no-treatment-inoculation control.

Example 2

Seeds of determinate soybean are coated with a mefentrifluconazole aqueous suspension concentrate so that the amount of mefentrifluconazole to be applied to each seed may be 0.2 mg. Then, the determinate soybean seeds are sown to a pot filled with a soil at a sowing rate of 100,000 seeds per hectare. That is, the application rate of mefentrifluconazole is 20 g per hectare. Then, the determinate soybean is incubated in a greenhouse for 10 days, followed by inoculating a pathogen of Asian soybean rust (*Phakopsora pachyrhizi*) to the foliage of determinate soybean. The determinate soybean is incubated in a greenhouse for 14 days from the inoculation, and then the fresh weight of the aerial part of the determinate soybean is measured. It is confirmed that the fresh weight is equivalent to that of the control where determinate soybean is not treated with mefentrifluconazole and the pathogen is not inoculated (no-treatment-no-inoculation control) and is bigger than that of the control where determinate soybean is not treated with mefentrifluconazole and the pathogen is inoculated (no-treatment-inoculation control).

Comparative Example 2

The same procedure of the example 2 is repeated except for replacing determinate soybean with indeterminate soybean or semi-determinate soybean. It is confirmed that the fresh weight of indeterminate soybean or semi-determinate soybean is smaller than that of the corresponding no-treatment-no-inoculation control and is equivalent to that of the corresponding no-treatment-inoculation control.

Example 3

Determinate soybean is sown to a pot filled with a soil at a sowing rate of 1,000,000 seeds per hectare. The determinate soybean is incubated for 10 days in a greenhouse, and then mefentrifluconazole dilution liquid (prepared by diluting an aqueous suspension concentrate of mefentrifluconazole with water) is dripped onto the primary leaf of determinate soybean so that the amount of mefentrifluconazole to be applied to each plant may be 0.2 mg. That is, the application rate of mefentrifluconazole is 200 g per hectare. On the next day of the application, a pathogen of Asian soybean rust (*Phakopsora pachyrhizi*) is inoculated to the foliage of determinate soybean. The determinate soybean is incubated in a greenhouse for 14 days from the inoculation, and then fresh weight of the aerial part of the determinate soybean is measured. It is confirmed that the fresh weight is equivalent to that of the control where determinate soybean is not treated with mefentrifluconazole and the pathogen is not inoculated (no-treatment-no-inoculation control) and is bigger than that of the control where determinate soybean is not treated with mefentrifluconazole and the pathogen is inoculated (no-treatment-inoculation control).

Comparative Example 3

The same procedure of the example 3 is repeated except for replacing determinate soybean with indeterminate soybean or semi-determinate soybean. It is confirmed that the fresh weight of indeterminate soybean or semi-determinate soybean is smaller than that of the corresponding no-treatment-no-inoculation control and is equivalent to that of the corresponding no-treatment-inoculation control.

Example 4

Seeds of two varieties of determinate soybean were separately dipped in a mefentrifluconazole dilution liquid (prepared by diluting an aqueous suspension concentrate of mefentrifluconazole with water) so that the amount of mefentrifluconazole to be applied to each seed might be 0.2 mg. Then, the determinate soybean seeds were sown to a pot filled with a soil at a sowing rate of 1,000,000 seeds per hectare. That is, the application rate of mefentrifluconazole was 200 g per hectare. Each determinate soybean was incubated in a greenhouse for 11 days from the sowing, and then a pathogen of Asian soybean rust (*Phakopsora pachyrhizi*) was inoculated to the foliage of each determinate soybean. Each determinate soybean was incubated in a greenhouse for 7 days from the inoculation, and then fresh weight of the aerial part of each determinate soybean was measured. The fresh weight is referred to as 'the fresh weight in treatment plot'.

As a control experiment, the same procedure was repeated except that dipping treatment with mefentrifluconazole dilution liquid and the inoculation of the pathogen were not conducted. The fresh weight obtained in the control experiment is referred to as 'the fresh weight in control plot'.

The results are shown in Table 1. As shown in Table 1, each determinate soybean was successfully protected from the damage by the pathogen.

TABLE 1

| Variety/growth habit | Fresh weight in treatment plot (A) (mg/plant) | Fresh weight in control plot (B) (mg/plant) | Treatment/control ratio (100 × A/B) |
|---|---|---|---|
| Toyomusume/Determinate | 4.92 | 4.67 | 105 |
| Tambaguro/Determinate | 7.17 | 6.89 | 104 |

Comparative Example 4

The same procedure of the example 4 was repeated except for replacing two varieties of determinate soybean with two varieties of indeterminate soybean. The results are shown in Table 2. As shown in Table 2, each indeterminate soybean was not successfully protected from the damage by the pathogen.

TABLE 2

| Variety/growth habit | Fresh weight in treatment plot (A) (mg/plant) | Fresh weight in control plot (B) (mg/plant) | Treatment/control ratio (100 × A/B) |
|---|---|---|---|
| Kurosengoku/Indeterminate | 1.40 | 2.06 | 68 |
| Harosoy/Indeterminate | 2.08 | 3.74 | 55 |

Example 5

Two varieties of determinate soybean were sown to a pot filled with a soil at a sowing rate of 1,000,000 seeds per hectare. Then each determinate soybean was incubated for days in a greenhouse. A mefentrifluconazole dilution liquid (prepared by diluting an aqueous suspension concentrate of mefentrifluconazole with water) is dripped onto the apical bud of determinate soybean plants so that the amount of mefentrifluconazole to be applied to each plant might be 0.5 mg. That is, the application rate of mefentrifluconazole was 500 g per hectare. Three days after the application, a pathogen of Asian soybean rust (*Phakopsora pachyrhizi*) was inoculated to the foliage of each determinate soybean. Each determinate soybean was incubated in a greenhouse for 7 days from the inoculation, and then fresh weight of the aerial part of each determinate soybean was measured. The fresh weight is referred to as 'the fresh weight in treatment plot'.

As a control experiment, the same procedure was repeated except that dripping treatment with mefentrifluconazole dilution liquid and the inoculation of the pathogen were not conducted. The fresh weight obtained in the control experiment is referred to as 'the fresh weight in control plot'.

The results are shown in Table 3.

TABLE 3

| Variety/growth habit | Fresh weight in treatment plot (A) (mg/plant) | Fresh weight in control plot (B) (mg/plant) | Treatment/control ratio (100 × A/B) |
|---|---|---|---|
| Toyomusume/Determinate | 3.97 | 4.67 | 85 |
| Tambaguro/Determinate | 5.65 | 6.89 | 82 |

Comparative Example 5

The same procedure of the example 5 was repeated except for replacing two varieties of determinate soybean with two varieties of indeterminate soybean. The results are shown in Table 4.

As shown in Tables 3 and 4, determinate soybeans were protected much more effectively compared with indeterminate soybeans.

TABLE 4

| Variety/growth habit | Fresh weight in treatment plot (A) (mg/plant) | Fresh weight in control plot (B) (mg/plant) | Treatment/control ratio (100 × A/B) |
|---|---|---|---|
| Kurosengoku/Indeterminate | 1.00 | 2.06 | 49 |
| Williams 82/Indeterminate | 0.77 | 1.96 | 39 |

INDUSTRIAL APPLICABILITY

Determinate soybean can be safely protected from damage by a plant pathogen according to the present invention.

The invention claimed is:

1. A method of treating seeds of determinate soybean for protecting determinate soybean from damage by a plant pathogen, comprising applying mefentrifluconazole to the seeds of determinate soybean, wherein the application rate of mefentrifluconazole is approximately 0.01 to 0.2 mg per seed of the determinate soybean,
   wherein the determinate soybean has not been bred to be tolerant to mefentrifluconazole transgenically or non-transgenically.
2. Seeds of determinate soybean treated with mefentrifluconazole, wherein the application rate of mefentrifluconazole is approximately 0.01 to 0.2 mg per seed of the determinate soybean, wherein the determinate soybean has not been bred to be tolerant to mefentrifluconazole transgenically or non-transgenically.

\* \* \* \*